United States Patent [19]

Oberlin et al.

[11] Patent Number: 5,434,995
[45] Date of Patent: Jul. 18, 1995

[54] BARRIER SYNCHRONIZATION FOR DISTRIBUTED MEMORY MASSIVELY PARALLEL PROCESSING SYSTEMS

[75] Inventors: Steven M. Oberlin, Chippewa Falls; Eric C. Fromm, Eau Claire, both of Wis.

[73] Assignee: Cray Research, Inc., Eagan, Minn.

[21] Appl. No.: 165,265

[22] Filed: Dec. 10, 1993

[51] Int. Cl.⁶ .................... G06F 15/16; G06F 15/80
[52] U.S. Cl. .................. 395/550; 395/650; 364/DIG. 1; 364/271.2; 364/228.7; 364/228.3
[58] Field of Search ............. 395/325, 550, 650, 800

[56] References Cited

U.S. PATENT DOCUMENTS 5,083,265 1/1992 Valiant ........................... 395/800
5,127,092 6/1992 Gupta et al. .................... 364/DIG. 2

OTHER PUBLICATIONS

Digital Equipment Corporation, digital™, "DECChip™ 21064-AA RISC Microprocessor Preliminary Data Sheet," ©Digital Equipment Corporation Apr. 29, 1992.
Harold S. Stone, "High-Performance Computer Architecture," pp. 336-338 and 398.
Digital Equipment Corporation, "EV3 and EV4 Specification DC227 and DC228," Revision/Update Information: Version 2.0 May 3, 1991.
James T. Kuehn and Burton J. Smith, "The Horizon Supercomputing System: Architecture and Software," pp. 28-34.
The Computer Society of the IEEE, "28th Annual Symposium on Foundations of Computer Science—(Formerly called the Annual Symposium on Switching and Automata Theory), sponsored by the Computer Society of the IEEE Technical Committee on Mathematical Foundations of Computing," Oct. 12-14, 1987, IEEE 87CH2471-1, pp. 185-194.
L. G. Valiant, Harvard University, Cambridge, Mass., "Optimally universal parallel computers," Phil. Trans. R. Sco. Lond. A. 326, pp. 373-376 (1988).
Geoffrey C. Fox and David W. Walker, California Institute of Technology, "A Portable Programming Environment for Multiprocessors."
Phillip B. Gibbons, Computer Science Division, University of California, "A More Practical PRAM Model," 1989 ACM 0-89791-323-X/89/0006/0158, pp. 158-168.
Clyde p. Kruskal, Larry Rudolph and Marc Snir, "Research Report—A Complexity Theory of Efficient Parallel Algorithms," RC 13572 (#60702) Mar. 4, 1988, Computer Science, 59 pages.

Primary Examiner—Thomas M. Heckler
Attorney, Agent, or Firm—Schwegman, Lundberg & Woessner

[57] ABSTRACT

A barrier mechanism provides a low-latency method of synchronizing all or some of the processing elements (PEs) in a massively parallel processing system. The barrier mechanism is supported by several physical barrier synchronization circuits, each receiving an input from every PE in the processing system. Each PE has two associated barrier synchronization registers, in which each bit is used as an input to one of several logical barrier synchronization circuits. The hardware supports both a conventional barrier function and an alternative eureka function. Each bit in each of the barrier synchronization registers can be programmed to perform as either barrier or eureka function, and all bits of the registers and each barrier synchronization circuit functions independently. Partitioning among PEs is accomplished by a barrier mask and interrupt register which enables certain of the bits in the barrier synchronization registers to a defined group of PEs. Further partitioning is accomplished by providing bypass points in the physical barrier synchronization circuits to subdivide the physical barrier synchronization circuits into several types of PE barrier partitions of varying size and shape. The barrier mask and interrupt register and the bypass points are used in concert to accomplish flexible and scalable partitions corresponding to user-desired sizes and shapes with a latency several orders of magnitude faster than existing software implementations.

10 Claims, 12 Drawing Sheets

BARRIER SYNCHRONIZATION FOR DISTRIBUTED MEMORY MASSIVELY PARALLEL PROCESSING SYSTEMS

FIELD OF THE INVENTION

The present invention relates generally to massively parallel processing systems, and more particularly to a barrier synchronization mechanism for facilitating synchronization between multiple processors in such a system.

BACKGROUND OF THE INVENTION

Massively parallel processing (MPP) systems are computing systems comprised of hundreds or thousands of processing elements (PEs). While the power of a multiple instruction-multiple data (MIMD) computer system lies in its ability to execute independent threads of code simultaneously, the inherently asynchronous states of the PEs (with respect to each other) makes it difficult in such a system to enforce a deterministic order of events when necessary. Program sequences involving interaction between multiple PEs such as coordinated communication, sequential access to shared resources, controlled transitions between parallel regions, etc., may require synchronization of the PEs in order to assure proper execution.

An important synchronization capability in any programming model is the barrier. Barriers are points placed in the code beyond which no processor participating in a computation may proceed before all processors have arrived. Since processors wait at a barrier until alerted that all PEs have arrived, the latency of the barrier mechanism can be very important. The latency of a barrier mechanism is the propagation time between when the last processor arrives at a barrier, and when all processors have been notified that the barrier has been satisfied. During this period of time, all PEs may be idle waiting for the barrier to be satisfied. Hence barriers are a serialization point in a parallel code.

Barriers can be implemented entirely by software means, but software schemes are typically encumbered by long latencies and/or limited parallelism restricting how many processors can arrive at the barrier simultaneously without artificial serialization. Because a barrier defines a serialization point in a program, it is important to keep the latency as low as possible.

Hardware support for barriers, while addressing the latency problems associated with barriers implemented by purely software means, can have other shortcomings that limit the utility of the mechanism in a production computing system. Production computing systems demand that the barrier resource (like all resources) be partitionable among multiple users while maintaining protective boundaries between users. In addition, the barrier resource must be rich enough to allow division between the operating system and the user executing within the same partition. Provision must also be made for fault tolerance to insure the robust nature of the barrier mechanism.

Hardware mechanisms may also suffer from an inability to operate synchronously. This inability may require that a PE, upon discovering that a barrier has been satisfied (all PEs have arrived at that point in the program), wait until all PEs have discovered that the barrier has been reached before it may proceed through the next section of program code. The ability to operate synchronously enables the barrier mechanism to be immediately reusable without fear of race conditions.

Hardware mechanisms may also require that a PE explicitly test a barrier flag to discover when the barrier condition has been satisfied. This can prevent a PE from accomplishing other useful work while the barrier remains unsatisfied, or force the programmer to include periodic tests of the barrier into the program in order to accomplish other useful work while a barrier is pending. This can limit the usefulness of a barrier mechanism when used as a means of terminating speculative parallel work (e.g., a database search) when the work has been completed (e.g. the searched-for item has been found).

SUMMARY OF THE INVENTION

To overcome the above described shortcomings in the art and provide key system resources necessary for production computing, the present invention provides a hardware mechanism that facilitates barrier synchronization in a massively parallel processing system. The present barrier mechanism provides a partitionable, low-latency, immediately reusable, robust mechanism which can be used to alert all PEs in a partition when all of the PEs in that partition have reached a designated point in the program. The mechanism permits explicit testing of barrier satisfaction, or can alternately interrupt the PEs when a barrier has been satisfied. The present invention also provides an alternate barrier mode that satisfies a barrier when any one PE has reached a designated point in the program, providing the capability to terminate speculative parallel work. The present barrier mechanism provides multiple barrier resources to a partition to allow pipelining of barriers to hide the latency as well as offering raw latencies 2-3 orders of magnitude faster than software implementations. The barrier mechanism is also partitionable for multi-users. Barriers are used to bulk-synchronize the processors in a partition between loops where producer/consumer hazards may exist, or control entry and exit between segments of a program.

BRIEF DESCRIPTION OF THE DRAWINGS

The foregoing and other objects, features and advantages of the invention, as well as the presently preferred embodiments thereof, will become apparent upon reading and understanding the following detailed description and accompanying drawings in which.

DETAILED DESCRIPTION OF THE PREFERRED EMBODIMENT

In the following detailed description of the preferred embodiment, reference is made to the accompanying drawings which form a part hereof, and in which is shown by way of illustration a specific embodiment in which the invention may be practiced. It is to be understood that the present detailed description is intended as exemplary only, and that other embodiments may be utilized and structural changes made without departing from the spirit and scope of the present invention.

Figure 1:
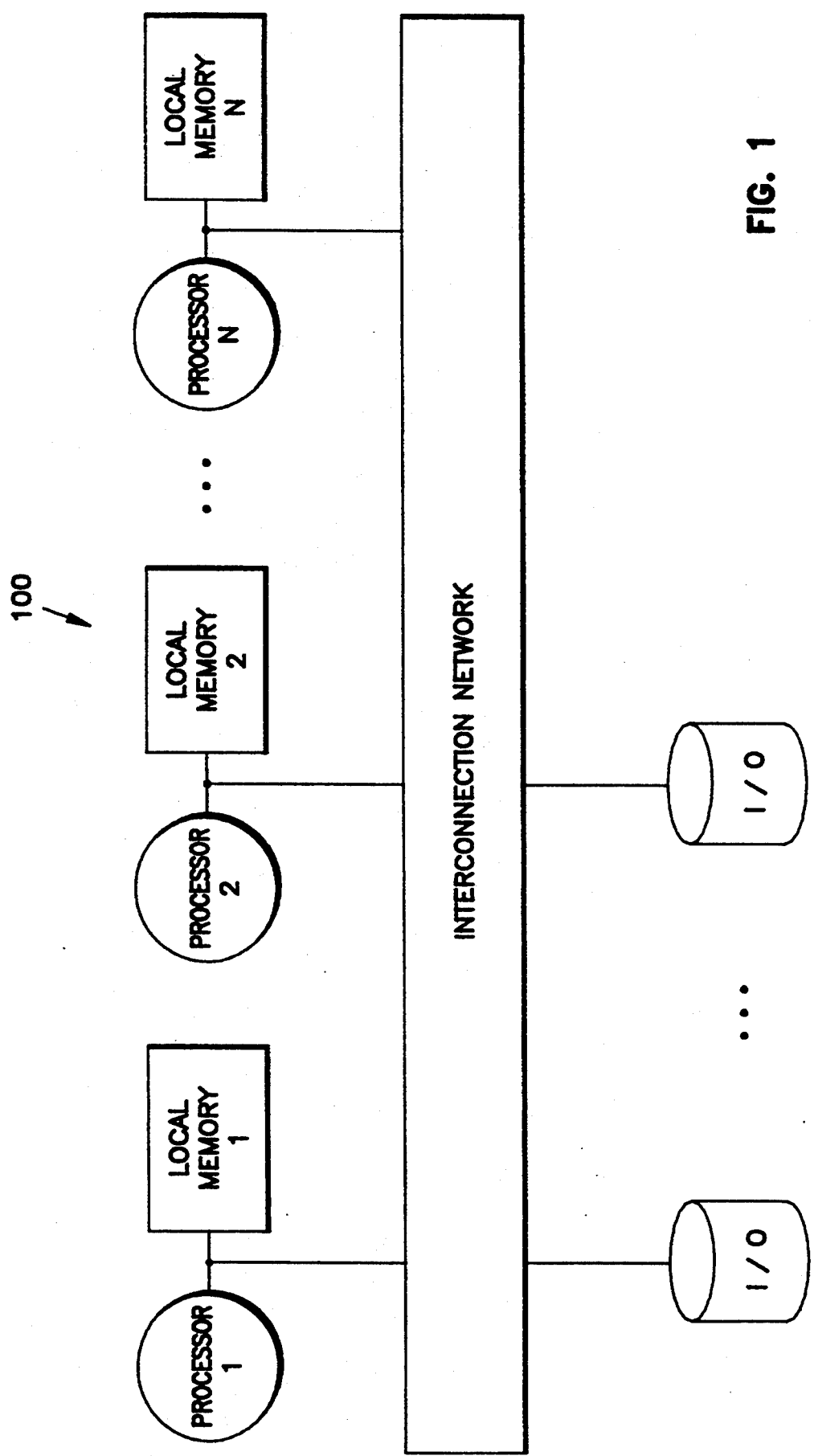
FIG. 1 shows a simplified block diagram of a representative MPP system with which the present barrier mechanism can be used.

The preferred MPP system, for which the present invention provides hardware support for barrier synchronization, is a MIMD massively parallel multiprocessor with a physically distributed, globally addressable memory. A representative MPP system 100 is shown in FIG. 1. The MPP system 100 contains hundreds or thousands of processors, each accompanied by a local memory and associated support circuitry. Each processor, local memory and support circuity component is called a processing element (PE). The PE's in the MPP system 100 are linked via an interconnect network.

The preferred MPP system 100 has a physically distributed memory, wherein each processor has a favored, low latency, high bandwidth path to a local memory, and a longer latency lower bandwidth access to the memory banks associated with other processors over the interconnect network. In the preferred embodiment, the interconnect network is comprised of a 3-dimensional torus which when connected creates a 3-dimensional matrix of PEs. The torus design has several advantages, including speed of information transfers and the ability to avoid bad communication links. The interconnect network is also scalable in all three dimensions. The interconnect network is described in more detail in the copending and commonly assigned U.S. patent application Ser. No. 07/983,979, entitled "Direction Order Routing in Multiprocessing Systems", to Gregory M. Thorsen, filed Nov. 30, 1992, which is incorporated herein by reference.

Figure 2:
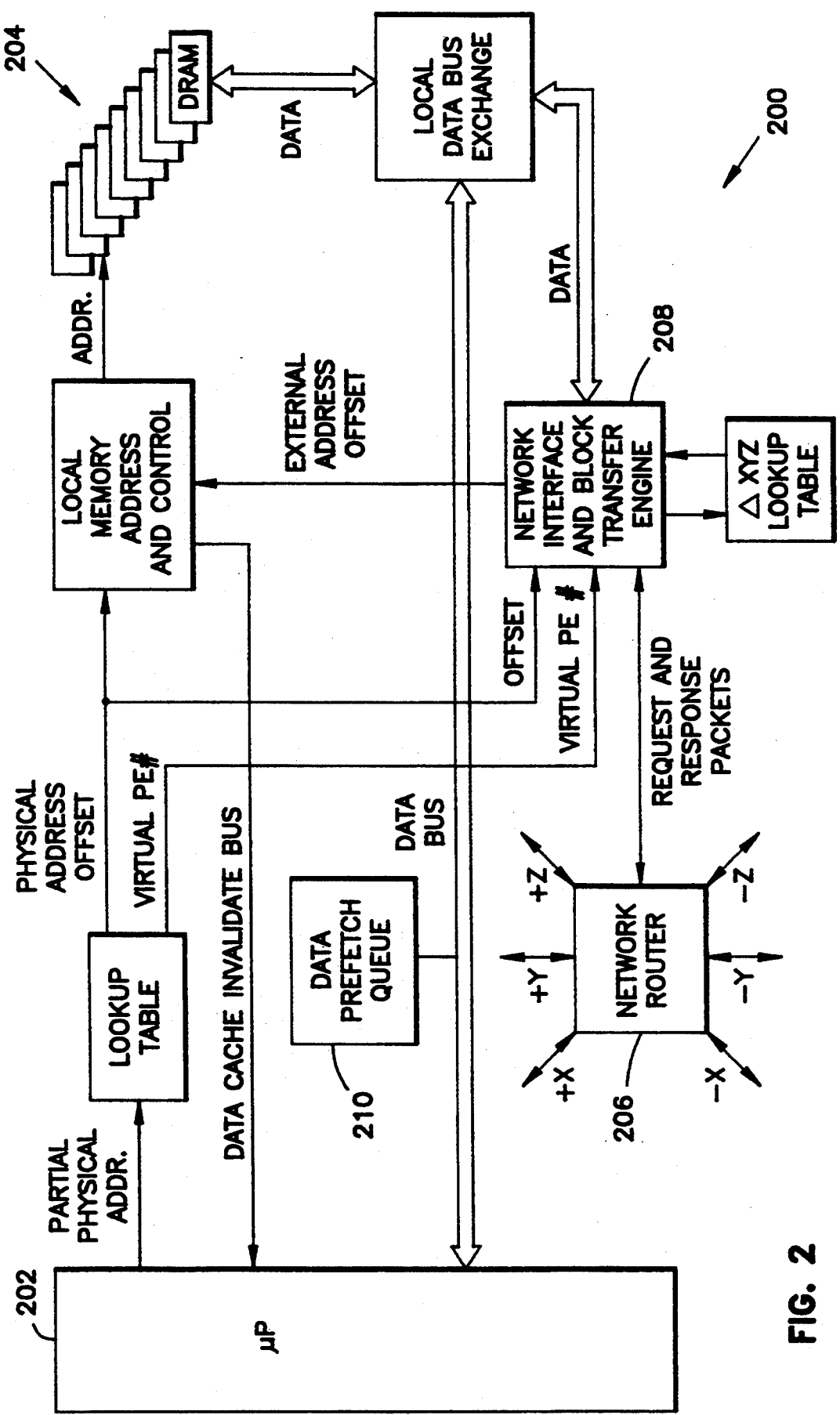
FIG. 2 shows a simplified block diagram of a processing element (PE), including a processor, local memory and associated shell circuitry.

FIG. 2 shows a simplified block diagram of a PE 200. An individual PE includes a high-performance RISC (reduced instruction set computer) microprocessor 202. In the preferred MPP system, microprocessor 202 is the DECChip 21064-AA RISC microprocessor, available from Digital Equipment Corporation. Each PE is coupled to a local memory 204 that is a distributed portion of the globally-addressable system memory, and includes a shell of circuitry that implements synchronization and communication functions facilitating interactions between processors.

The shell circuitry includes an interconnection network router 206, used to connect multiple PEs in the three-dimensional toroidal "fabric". The interconnection network carries all data communicated between PEs and memories that are not local. An address centrifuge and block transfer engine 208 in the PE shell circuitry permits asynchronous (i.e., independent of the local processor) movement of data between the local memory 204 and remote memories associated with other PEs, such as block transfers, with flexible addressing modes that permit a high degree of control over the distribution of data between the distributed portions of the system memory. The address centrifuge and block transfer engine are described in detail in the copending and commonly assigned U.S. Patent Application entitled "RECURSIVE ADDRESS CENTRIFUGE FOR DISTRIBUTED MEMORY MASSIVELY PARALLEL PROCESSING SYSTEMS", filed on even date herewith to Fromm, which application is incorporated herein by reference.

The shell circuitry also includes a data prefetch queue 210 which allows the processor 202 to directly initiate data movement between remote memories and the local processor in a way that can hide the access latency and permit multiple remote memory references to be outstanding.

Synchronization circuits in the shell permit synchronization at various different levels of program or data granularity in order to best match the synchronization method that is "natural" for a given parallelization technique. At the finest granularity, data-level synchronization is facilitated by an atomic swap mechanism that permits the locking of data on an element-by-element basis. A more coarse grain data-level synchronization primitive is provided by a messaging facility, which permits a PE to send a packet of data to another PE and cause an interrupt upon message arrival, providing for the management of message queues and low-level messaging protocol in hardware. Control-level synchronization at the program loop level is provided by a large set of globally accessible fetch-and-increment registers that can be used to dynamically distribute work (in the form of iterations of a loop, for instance) among processors at run time. The present invention provides yet another form of control-level synchronization, barrier synchronization, which is useful to control transitions between major program blocks (i.e., between loops performing actions on the same data sets).

Barrier Synchronization

The present invention provides hardware support for barrier synchronization which results in a low-latency method of synchronizing all or a portion of the PEs in an MPP system. The barrier synchronization mechanism of the present invention may be used to perform two types of synchronization: barrier and eureka.

A barrier is a point in program code where, after reaching the barrier, a processor must wait until all other processors participating in the computation have also reached the barrier. After all of the processors reach the barrier, the processors continue issuing program code.

A programmer may place a barrier in a program between distributed, parallel loops performing operations on the same data. By doing this, the programmer ensures that all of the processors associated with a loop finish the loop (all writes to shared data complete) before any of the processors continue with other program instructions (access the new values of the shared data).

A eureka is a point in program code where a condition is established that only a single processor need satisfy, thereby causing all processors to proceed beyond the eureka point. To participate in a eureka event, all processors initialize the eureka barrier mechanism described herein and enable an interrupt, then proceed executing program code to solve for the eureka condition. As soon as any processor completes the computation, it triggers the eureka, thus causing an interrupt to all PEs. The interrupt indicates that the eureka has been satisfied and all PEs may continue beyond the eureka point.

Eureka synchronization has several uses, including database searches. Using eureka synchronization, a programmer can stop a database search as soon as any processor succeeds in finding the desired data rather than waiting for all of the processors to exhaust the search.

Logical Barrier Synchronization Circuits

The preferred barrier mechanism has 16 logical barrier synchronization circuits. Each PE in the MPP system has an input to each of the 16 logical barrier synchronization circuits. The multiple barrier synchronization circuits facilitate partitioning between users and the operating system, as well as providing redundant resources for fault tolerance.

Figure 3:
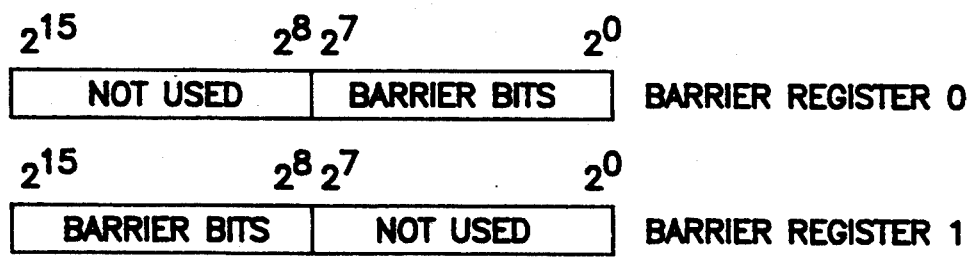
FIG. 3 shows the format of the barrier synchronization registers BSR0 and BSR1.

The inputs to the 16 logical barrier synchronization circuits are 16 bits which are contained in two special registers. Each PE contains two 8-bit registers called barrier synchronization register 0 (BSR0) and barrier synchronization register 1 (BSR1). FIG. 3 shows the format of BSR0 and BSR1. Each of the 16 bits which comprise BSR0 and BSR1 is an input to one of the 16 logical barrier synchronization circuits. Thus, each PE has an input to each of the 16 logical barrier synchronization circuits.

Barrier synchronization register 0 (BSR0) is an 8-bit, readable and writable, general access register. Preferably, BSR0 contains the eight least significant barrier bits for a PE. When read from, the value of BSR0 represents the value of bits $2^7$ through $2^0$ of BSR0. The remaining bits are not valid. Table 1 shows the bit format of BSR0 and describes each bit of the register.

TABLE 1

| Bits | BSR0 Format |
|---|---|
|  | Name |
| $2^0$ | Barrier bit $2^0$ |
| $2^1$ | Barrier bit $2^1$ |
| $2^2$ | Barrier bit $2^2$ |
| $2^3$ | Barrier bit $2^3$ |
| $2^4$ | Barrier bit $2^4$ |
| $2^5$ | Barrier bit $2^5$ |
| $2^6$ | Barrier bit $2^6$ |
| $2^7$ | Barrier bit $2^7$ |
| $2^{63}$–$2^8$ | These bits are not used. |

Barrier synchronization register 1 (BSR1) is an 8-bit, readable and writable, privileged access register. BSR1 contains the eight most significant barrier bits for a PE. When read from, the value of BSR1 represents the value of bits $2^{15}$ through $2^8$ of BSR1 and $2^7$ through $2^0$ of BSR0. The remaining bits are not valid. Table 2 shows the bit format of BSR1 and describes each bit of the register.

TABLE 2

| Bits | BSR1 Format |
|---|---|
|  | Name |
| $2^7$–$2^0$ | These bits are not used; however, when BSR1 is read, these bits contain the value of bits $2^7$ through $2^0$ of BSR0. |
| $2^8$ | Barrier bit $2^8$ |
| $2^9$ | Barrier bit $2^9$ |
| $2^{10}$ | Barrier bit $2^{10}$ |
| $2^{11}$ | Barrier bit $2^{11}$ |
| $2^{12}$ | Barrier bit $2^{12}$ |
| $2^{13}$ | Barrier bit $2^{13}$ |
| $2^{14}$ | Barrier bit $2^{14}$ |
| $2^{15}$ | Barrier bit $2^{15}$ |
| $2^{63}$–$2^{16}$ | These bits are not used. |

All 16 of the logical barrier synchronization circuits function identically and operate independently. An example of the operation of the barrier synchronization circuits will now be given, using bit $2^2$ of BSR0 when it is used for barrier synchronization and for eureka synchronization as an example for purposes of illustration. It shall be understood that the remaining bits function in the same way as bit $2^2$ in the following discussion.

Figure 4:
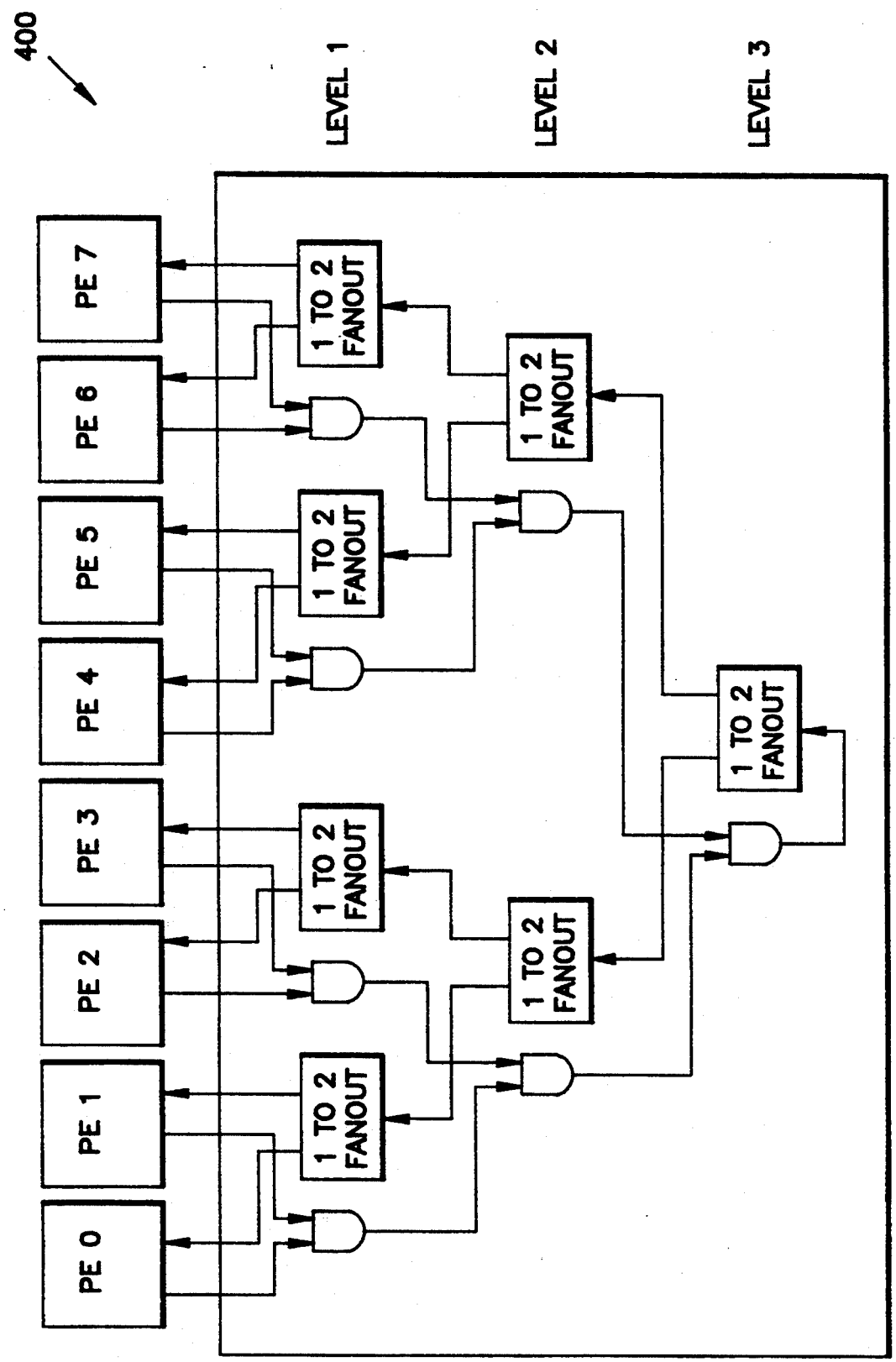
FIG. 4 shows a simplified radix-2 barrier synchronization circuit.

Each logical barrier synchronization circuit is implemented as an AND-tree and fanout-tree circuit. FIG. 4 shows a barrier synchronization circuit 400 in a simplified MPP system using 2-input AND gates to form the AND-tree. For simplicity of illustration, the MPP system shown in FIG. 4 contains only eight PEs. It shall be understood, however, that the present barrier mechanism and barrier synchronization circuits can be used with a system having any number of PEs.

Because the network in FIG. 4 is accommodating 8 processors, PE0–PE7, and the AND-tree is implemented with 2-input AND gates, $\log_2 8 = 3$ levels of AND-tree are required to arrive and a final barrier bit representing the logical product of all the PEs' barrier bits.

As a starting condition, before barrier synchronization begins, bit $2^2$ of BSR0 is reset to 0 in all of the PEs. When a processor satisfies the barrier condition, that processor sets bit $2^2$ of its associated BSR0 register to 1. This action sends a 1 to one of the AND gates in the first layer of the AND-tree.

The first layer of the AND-tree shown in FIG. 4 contains four AND gates. Each AND gate receives signals from two PEs. For example, one AND gate may receive signals from bit $2^2$ of BSR0 in PE0 and bit $2^2$ of BSR0 in PE 1. When all of the processors reach the barrier point in the program code (satisfy the barrier) they have each set bit $2^2$ of their associated BSR0 to 1, causing the output of each of the four AND gates in the first level of the AND-tree to switch to 1.

The second level of the AND-tree of FIG. 4 contains two AND gates. Each AND gate receives signals from two of the AND gates in the first level of the AND-tree. When the output of all of the AND gates in the first level of the AND-tree are 1, the output of both the AND gates in the second level of the AND-tree are 1.

The third level of the AND-tree contains the final AND gate. This AND gate receives signals from both AND gates in the second level of the AND-tree. When the output of both AND gates in the second level of the AND-tree are 1, the output of the final AND gate is 1. The output of the final AND gate sends an input to the fanout-tree circuit. The fanout tree circuit is used to report the result of the AND-tree back to PEs.

The first fanout block in the fanout tree receives a 1 from the single level 3 AND gate. After creating two copies of the 1, the first fanout block sends the 1's to the two fanout blocks in the second level of the fanout tree.

The two fanout blocks in the second level of the fanout tree each create two copies of the 1. The two fanout blocks in the second level of the fanout tree then sends the 1's to four fanout blocks in the first level of the fanout tree.

The four fanout blocks in the first level of the fanout tree each create two copies of the 1. The fanout blocks in the first level of the fanout tree then send the 1's to the eight PEs. This signals all of the PEs in the system that all of the processors have reached the barrier and the processor in the PE may continue with other program instructions. Because the fanout tree is dependent on the AND-tree, the fanout tree will report that all of the PEs have reached the barrier only when each PE in the system has set bit $2^2$ to 1.

As will be described more fully below in connection with FIG. 14, the barrier mechanism is designed to be immediately reusable. This means that as soon as a processor detects that the barrier bit has cleared (all processors have arrived at the barrier), it can immediately set the barrier bit again to announce its arrival at the next barrier if applicable. Doing so does not affect the notification of the prior barrier satisfaction to any other PE.

Eureka Synchronization

A logical barrier synchronization circuit 400 may also be used to perform eureka synchronization. One use of the eureka function is for the synchronization of a distributed, parallel data search. Once one of the PEs has located the targeted information, the successful PE can set a eureka bit to inform the other PEs involved that the search is completed.

Figure 6:
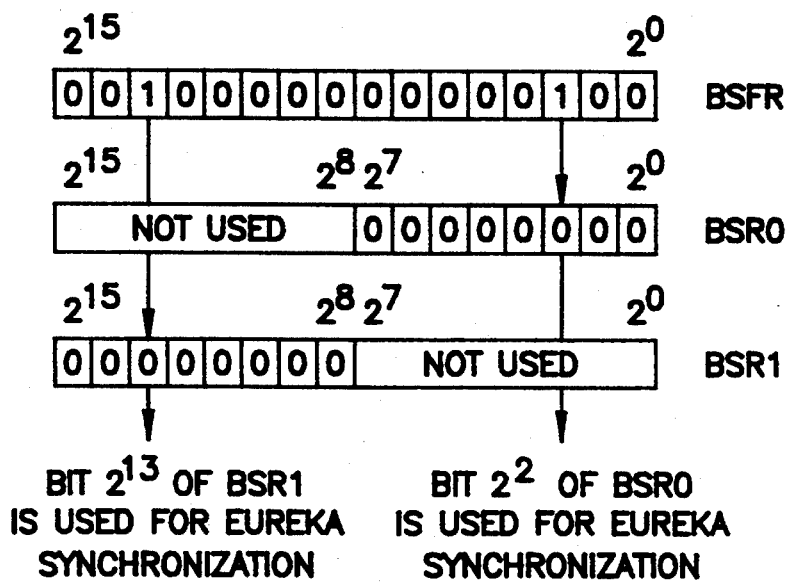
FIG. 6 shows the format of the barrier synchronization function (BSFR) register.

To enable the eureka function, each PE contains a register called the barrier synchronization function register (BSFR). FIG. 6 shows the format of the BSFR and how it functions in conjunction with the BSR0 and BSR1 registers. The barrier synchronization function register (BSFR) is preferably a 16-bit, write-only, system privileged register. The BSFR contains a 16-bit mask that indicates which bits of BSR0 and BSR1 are used for barrier synchronization and which bits are used for eureka synchronization. Bits 0–7 of the BSFR control the function of BRS0 and bits 8–15 of the BSFR control BSR1. If a bit of the BSFR is set to 1, the corresponding bit of BSR0 or BSR1 is used for eureka synchronization. If a bit of the BSFR is set to 0, the corresponding bit of BSR0 or BSR1 is used for barrier synchronization. Table 3 shows the bit format of BSFR and describes each bit of the register.

TABLE 3

| Bits | Name |
|---|---|
| | BSFR Format |
| $2^7$–$2^0$ | These bits indicate which bits of BSR0 are used for eureka synchronization. For example, as shown in FIG. 6, when bit $2^2$ of the BSFR is set to 1, bit $2^2$ of BSR0 is used for eureka synchronization. When bit $2^2$ of the BSFR is set to 0, bit $2^2$ of BSR0 is used for barrier synchronization. |
| $2^{15}$–$2^8$ | These bits indicate which bits of BSR1 are used for eureka synchronization. For example, as shown in FIG. 6, when bit $2^{13}$ of the BSFR is set to 1, bit $2^{13}$ of BSR1 is used for eureka synchronization. When bit $2^{13}$ of the BSFR is set to 0, bit $2^{13}$ of BSR1 |

TABLE 3-continued

| Bits | Name |
|---|---|
| | BSFR Format |
| | is used for barrier synchronization. |
| $2^{63}$–$2^{16}$ | These bits are not used. |

Because each of the 16 logical barrier synchronization circuits operate completely independently of each other, any of the bits in each of the two barrier synchronization registers BSR0 and BSR1 for a particular PE can be programmed to function in the conventional barrier mode, or in eureka mode. As will be described below in connection with FIG. 14, in eureka mode the output of the AND-tree is read directly by the PEs with no intervening synchronization logic such as the latch used in conventional barrier synchronization.

Because in eureka mode the output of the fanout tree is read directly by the PEs, the barrier hardware is not synchronous as it is in conventional barrier mode, nor is a eureka bit immediately reusable. Using a barrier bit in eureka mode requires the use of a second bit programmed to function in barrier mode in order to prevent race conditions. The conventional barrier is used to synchronize the entry and exit of the PEs into and out of a eureka barrier. This implementation means that only half of the 16 barrier bits can be used for eureka synchronization.

Reading BSR0 or BSR1 returns the current state of the AND-tree. This allows the AND-tree to be used as an OR tree by using negative logic. After all PEs initialize their barrier bit to a logical 1, the output of the AND-tree can be read as a one by all PEs. If any PE writes a zero to its barrier bit, the output of the AND-tree will read as a zero, performing the OR function.

A typical eureka sequence begins with all processors initializing the eureka bit to a logical 1 and setting the conventional barrier bit to a logical 1. When the barrier switches to a zero (meaning all processors have initialized their eureka bit and joined the barrier), the eureka bit is "armed". The processors then begin the parallel data search or other activity that is to be terminated by the eureka. When a processor satisfies the termination conditions, it clears its eureka bit to alert the other processors and sets its conventional barrier bit to indicate it has observed the eureka event. As each of the other PEs detect that the eureka event has occurred (because the output of the eureka AND-tree drops to a logical 0), it sets its conventional barrier bit and waits for the barrier to complete. When all PEs have joined the final barrier, they may proceed to arm the next eureka.

Servicing A Barrier

In the preferred embodiment of the present invention, the processor monitors the output of the fanout circuitry using one of two mechanisms: periodically testing the barrier bit (such as with a continuous loop) or enabling a barrier interrupt.

Continuing to use bit $2^2$ as an example, in the first mechanism, after the processor sets bit $2^2$ of BSR0 to 1, the processor may enter a loop that continuously checks the value of bit $2^2$ of BSR0. After receiving a 1 from the fanout circuitry, the support circuitry in the PE resets bit $2^2$ of BSR0 to 0. Because the processor is regularly checking the value of bit $2^2$ of BSR0, the processor may continue executing program instructions as soon as it is detected that bit $2^2$ of BSR0 is reset to 0.

In the barrier interrupt mechanism, after the processor satisfies the barrier and sets bit $2^2$ of BSR0 to 1, the processor enables a barrier interrupt. The processor may then issue program instructions that are not associated with the barrier. After receiving a 1 from the fan-out circuitry, the support circuitry in the PE resets bit $2^2$ of BSR0 to 0 and sets the barrier interrupt to the processor. The barrier interrupt indicates to the processor that all of the processors have reached the barrier, and causes the processor to suspend the unrelated activity and return to executing instructions associated with the barrier. The advantage of the barrier interrupt over continuous polling is the ability to perform other useful work while the other processors are approaching the barrier.

In the preferred embodiment, the microprocessor enables the barrier hardware interrupt using a hardware interrupt enable register (HIER) in the microprocessor system control register. For more information on the HIER and the system control register, refer to the DECChip 21064-AA RISC Microprocessor Preliminary Data Sheet, available from Digital Equipment Corporation, which is incorporated herein by reference. The DEC microprocessor has 6 inputs for external hardware interrupts. These inputs appear in the HIRR (Hardware Interrupt Request Register) in bit positions 5–7 and 10–12. One of these six inputs is designated as the Barrier Interrupt Request bit.

The HIRR inputs can be enabled or disabled by a mask bit located in the HIER (Hardware Interrupt Enable Register) internal to the microprocessor. For more information on the HIRR and HIER registers, refer to pages 3-26 through 3-29 in the Digital Equipment Corporation publication: EV-3 AND EV-4 SPECIFICATION Version 2.0 May 3, 1991, which is incorporated herein by reference.

Those skilled in the art are aware that all RISC microprocessors provide comparable facilities for allowing and controlling the direct sampling of external hardware interrupt signals, and that the present invention is not limited to use with the DEC RISC microprocessor described herein.

The interrupt input to the microprocessor is asserted whenever any of the barrier bits selected by the BSMI (barrier synchronization mask and interrupt, discussed below) make the transition from a logical 1 to a logical 0. The interrupt input to the microprocessor is cleared by writing a bit in the system control register. To assure that no satisfied barrier events are missed, the correct programming sequence would be to clear the interrupt, then read BSR0 and BSR1 to determine which bit(s) have toggled.

After the support circuity sets the barrier hardware interrupt, the processor must read the BSMI register (as described below) to determine if the interrupt was associated with BSR0 or BSR1. When the processor reads the value of the BSMI register, the support circuitry clears the interrupt associated with BSR0 and the interrupt associated with BSR1.

If a barrier interrupt occurs while the processor is reading the BSMI register, the interrupt still occurs and is not cleared. The processor must then read the value of the BSMI register again to determine if the interrupt was associated with BSR0 or BSR1 and to clear the interrupts.

Logical Partitions

Not all of the PEs in a multiprocessing system may need to be part of a barrier or eureka synchronization process. Also, it is often desirable to have several partitions of PEs operational on different tasks simultaneously. To facilitate this, each PE also contains a barrier synchronization mask and interrupt (BSMI) register which is used to enable or disable a logical barrier synchronization circuit for a PE. The BSMI register contains a mask that indicates which bits of BSR0 and BSR1 are enabled for the PE, thus defining which partition(s) a PE is a member of, and defining partitioning among the PEs.

The 16 independent barrier synchronization circuits visible to the user in the barrier registers can be assigned by the operating system to different groups or teams of processors. The BSMI allows the barrier bits in any given processor to be enabled or disabled. Alone, the BSMI permits the division of the barrier resource among up to 16 different partitions with arbitrary membership. Used in conjunction with the barrier network partitioning capability described herein below, the BSMI allows the flexible subdivision of the barrier resource among a very large number of partitions in a scalable fashion.

Figure 7:
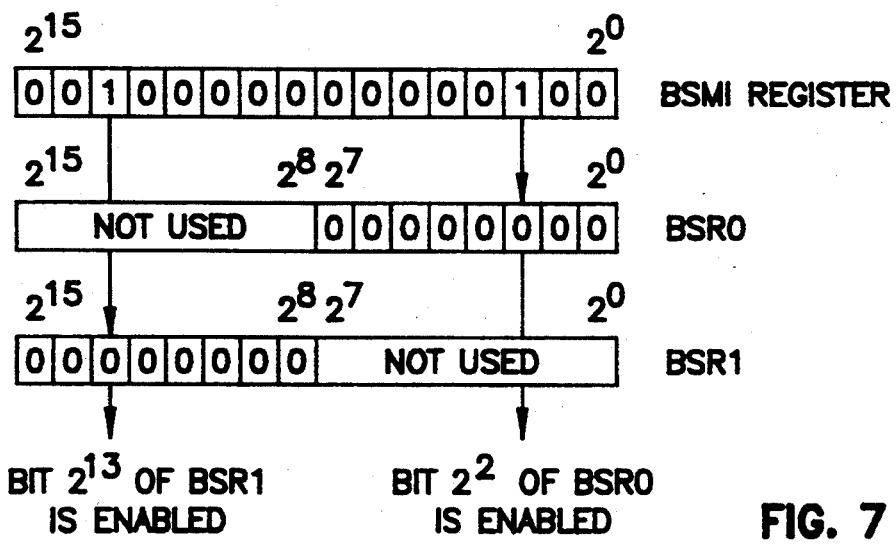
FIG. 7 shows the format of the barrier synchronization mask and interrupt (BSMI) register.

FIG. 7 shows the format of the BSMI register. The BSMI is a 16-bit, readable and writable, system privileged register. When written to, the BSMI register controls which bits in BSR0 and BSR1 are enabled for use by the PE. Bits 7–0 of BSMI enable the bits in BSR0, while bits 15–8 enable the bits in BSR1. If a bit of the BSMI register is set to 1, the corresponding bit of BSR0 or BSR1 is enabled. If a bit of the BSMI register is set to 0, the corresponding bit of BSR0 or BSR1 is disabled.

The BSMI register has a different bit format when written to than it does when it is read from. Table 4 shows the bit format of the BSMI register when it is written to and describes each bit of the register.

A disabled BSR0 or BSR1 bit appears to the logical product network to be always satisfied (a logical "1"). This permits the barrier to function normally for other processors whose barrier bit is enabled. Reading a disabled barrier synchronization register bit returns a logical "0". Writing a disabled barrier synchronization register bit has no effect.

TABLE 4

| Bits | BSMI Register Write Format Name |
|---|---|
| $2^7$–$2^0$ | These bits indicate which bits of BSR0 are enabled for use by the PE. For example, when bit $2^2$ of the BSMI register is set to 1, as shown in FIG. 7, bit $2^2$ of BSR0 is enabled for use by the PE. When bit $2^2$ of BSR0 is disabled and cannot be used by the PE. |
| $2^{15}$–$2^8$ | These bits indicate which bits of BSR1 are enabled for use by the PE. For example, when bit $2^{13}$ of the BSMI is set to 1, as shown in FIG. 7, bit $2^{13}$ of BSR1 is enabled for use by the PE. When bit $2^{13}$ of the BSMI is set to 0, bit $2^{13}$ of BSR1 is disabled and cannot be used by the PE. |
| $2^{63}$–$2^{16}$ | These bits are not used. |

Table 5 shows the bit format of the BSMI register when it is read from and describes each bit of the register. When read from, bits $2^{14}$ and $2^{15}$ of the BSMI register provide the current state of the barrier interrupts from BSR0 and BSR1, respectively. After being read the BSMI register is cleared.

TABLE 5

| BSMI Register Read Format | |
|---|---|
| Bits | Name |
| $2^{13}$–$2^0$ | These bits are not valid. |
| $2^{14}$ | This bit reflects the current state of the barrier interrupt associated with bits $2^7$ through $2^0$ of BSR0. |
| $2^{15}$ | This bit reflects the current state of the barrier interrupt associated with bits $2^{15}$ through $2^8$ of BSR1. |
| $2^{63}$–$2^{16}$ | These bits are not valid. |

Software may use the BSMI register to allow any set number of PEs to use one of the logical barrier synchronization circuits, and thus set up a partition among the PEs. For example, software may set bit $2^2$ of the BSMI register to 1 in only four of the PEs in an MPP system. In this case, only the four PEs with bit $2^2$ of the BSMI register set to 1 may use the logical barrier synchronization circuit associated with bit $2^2$ of BSR0. This creates a logical barrier partition among the four PEs.

The BSMI and BSFR registers can be used in concert to arrive at several different barrier synchronization mechanisms. Table 6 shows the effect of one bit from the BSMI register and the BSFR on the corresponding bit in BSR0 or BSR1.

TABLE 6

| Barrier Mask and Barrier Function Register: | | | | |
|---|---|---|---|---|
| BSMI Bit Value | BSFR Bit Value | Writing to BSR0 or BSR1 | Reading from BSR0 or BSR1 | Synchronization Type |
| 0 | 0 | No effect | Returns a 1 | Disabled |
| 0 | 1 | No effect | Returns a 1 | Disabled |
| 1 | 0 | Writing 1 indicates the microprocessor has reached the barrier. Writing 0 has no effect. | Returns a 1 if waiting for barrier to complete. Returns a 0 when barrier is complete. | Barrier |
| 1 | 1 | Writing 1 indicates the microprocessor is ready for eureka synchronization. Writing 0 indicates the microprocessor has completed the eureka process. | Returns a 1 if waiting for eureka to occur. Returns a 0 when a eureka occurs. | Eureka |

Physical Barrier Synchronization Circuits

Although each of the 16 bits in the BSR0 and BSR1 registers in each PE represent an input to one of 16 logical barrier synchronization circuits, the preferred embodiment of the present barrier synchronization mechanism does not contain 16 physical barrier synchronization circuits. Instead, in the preferred implementation, the system contains 4 physical barrier synchronization circuits. The 16 bits of BSR0 and BSR1 are time multiplexed into the four physical barrier synchronization circuits.

Figure 5:
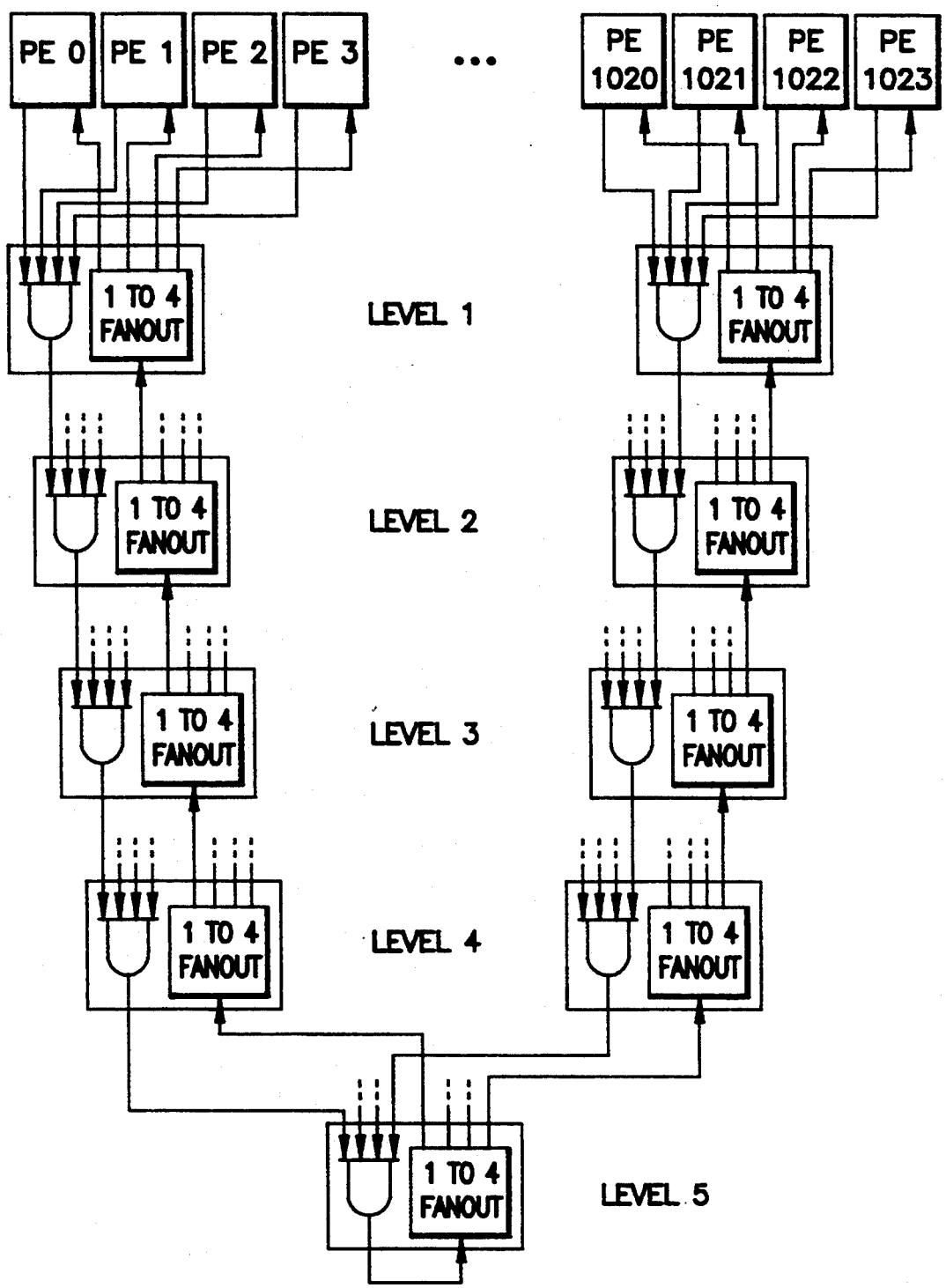
FIG. 5 shows a simplified radix-4 barrier synchronization circuit.

One exemplary physical barrier synchronization circuit is shown in FIG. 5. The preferred barrier network is implemented using a radix-4 AND-tree and fanout tree. As shown, a 1024 PE system contains $\log_4 1024 = 5$ levels in a barrier synchronization circuit.

Table 7 shows the input to each of the four physical barrier synchronization circuits during each clock period (CP). Four CPs are required for the physical barrier synchronization circuits to receive the input from all 16 bits in BSR0 and BSR1.

The input registers to the logical barrier synchronization circuits (as shown and described below in connection with FIG. 14) are completely parallel, so any number of PEs can set barrier bits in the same clock period without contention. All PEs are informed that a particular barrier has been reached simultaneously, although due to the time multiplexed nature of the inputs to the circuits different processors may be at different points in a spin-loop testing the barrier bit.

TABLE 7

| Physical Barrier Synchronization Circuit Inputs | | | | |
|---|---|---|---|---|
| Circuit | First CP | Second CP | Third CP | Fourth CP |
| 0 | Bit $2^0$ of BSR0 | Bit $2^4$ of BSR0 | Bit $2^8$ of BSR1 | Bit $2^{12}$ of BSR1 |
| 1 | Bit $2^1$ of BSR0 | Bit $2^5$ of BSR0 | Bit $2^9$ of BSR1 | Bit $2^{13}$ of BSR1 |
| 2 | Bit $2^2$ of BSR0 | Bit $2^6$ of BSR0 | Bit $2^{10}$ of BSR1 | Bit $2^{14}$ of BSR1 |
| 3 | Bit $2^3$ of BSR0 | Bit $2^7$ of BSR0 | Bit $2^{11}$ of BSR1 | Bit $2^{15}$ of BSR1 |

With the preferred radix-4 AND-tree implementation such as that shown in FIG. 5, each level of the tree takes approximately one clock period in logic and another 1 to 1.5 clock periods in wire travel time to accomplish. This assumption allows the latency for a barrier between 1024 processors to be estimated and compared with known latencies for software barrier techniques.

Table 8 illustrates the number of barrier bits and the estimated number of clock periods at each level of a radix-4 tree such as the one shown in FIG. 5 connecting 1024 PEs. The radix-four tree reduces the barrier bit count by a factor of four in each level.

TABLE 8

| Barrier bit logical product tree levels | |
|---|---|
| Number of barrier bits | Radix-four logical product tree level |
| 1024 | Level one, clock period 0 |
| 256 | Level two, clock period 2 |
| 64 | Level three, clock period 4 |
| 16 | Level four, clock period 6 |
| 4 | Level five, clock period 8.5 (1.5 clock wire) |
| 1 | Level six, clock period 11 (1.5 clock wire) |

From Table 8 it can be seen that eleven clock periods are consumed to perform the logical product of the barrier bits from 1024 PEs using a radix-four tree with two to two-and-a-half clock periods per level of delay. If it is further assumed that the necessary fan-out of the final logical product all 1024 PEs was performed using a series of one-to-four single-clock fan-outs, another eleven clock periods would elapse, bringing the total latency time of a barrier propagation to 22 clock periods.

From this, the projected performance impact of the radix-4 tree implementation is relatively straight-forward to predict. With a time multiplexed tree that is four bits wide, 4 cycles of the tree are required to update the values of all 16 barrier bits. This is in addition to the approximately 22 clocks of initial latency. The best case occurs when the last processor sets a barrier bit at the same time the 4-bit "slice" that bit is a member of is entered into the logical product network (refer again to Table 7), adding nothing to the tree latency of 22 clocks. The worst case occurs when the last processor just misses the best case, setting a bit one clock period after the slice that bit is a member of was entered into the network. When this happens, the slice must wait 4 clocks to be entered into the network and another 22 for the propagation delay of the network. The final result is a minimum time of 22 cycles, maximum of 26, and an average of around 24 cycles. The resulting delay is about 160 nanoseconds at a 6.6 nanosecond clock period, assuming that the barrier network is clocked at the same speed as the processor. This delay is several orders of magnitude faster than known software barrier implementations, which can approach 500 microseconds or higher. This significant advantage of the present barrier synchronization mechanism will be well appreciated by those of skill in the art.

Physical Partitions

Note in FIGS. 4 and 5 that the "shape" of the fanout tree closely matches the configuration of the AND-tree. In the preferred embodiment, the fan-in nodes performing the AND function are physically located on the same integrated circuits as the fanout blocks at each level of the tree. An AND gate and fanout block pair is called a bypass point. This advantage of location makes possible programmable subdivision, or physical partitioning, of each barrier synchronization network into independent subnetworks by rerouting the output of the AND gate in each bypass point.

Figure 8:
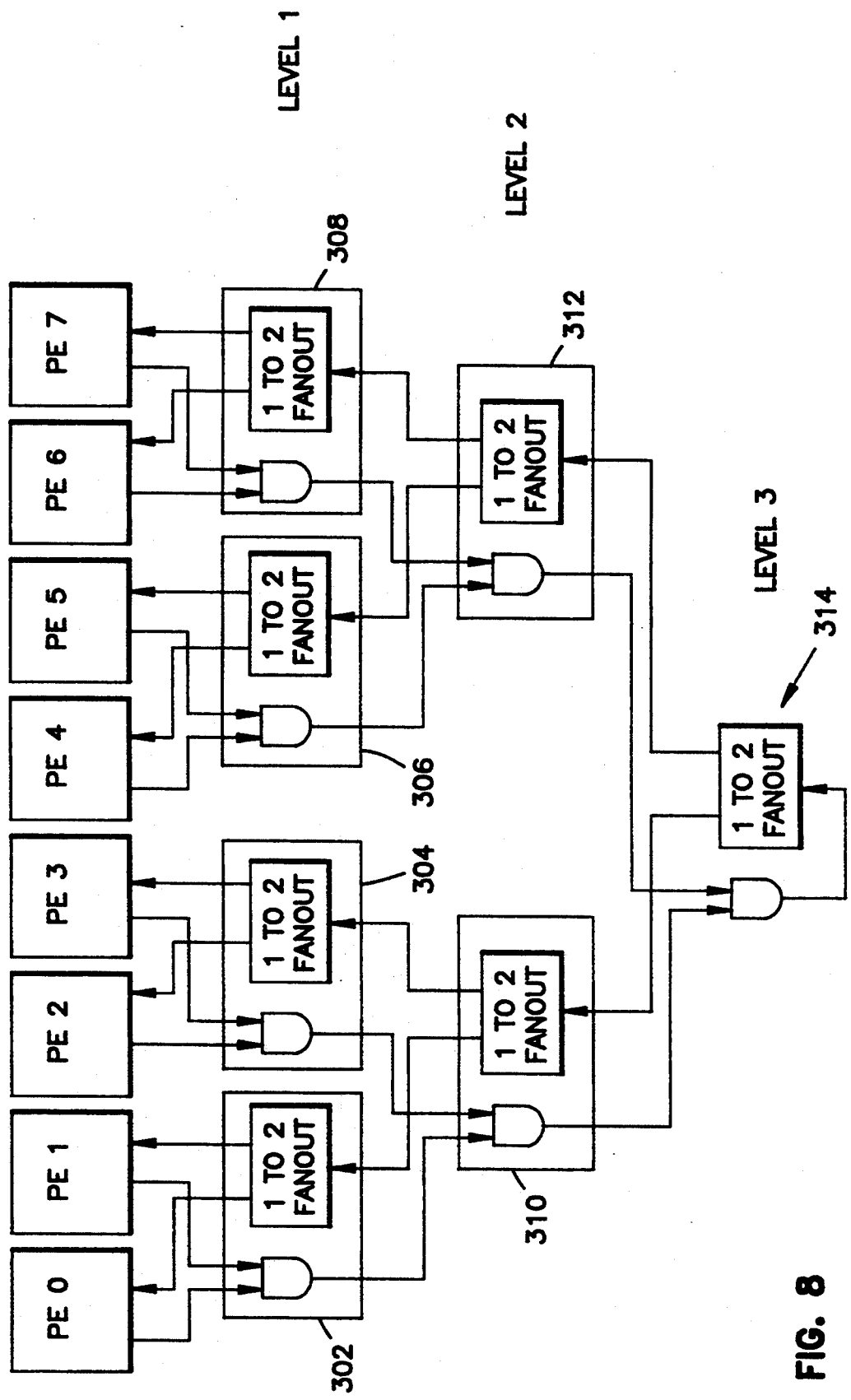
FIG. 8 shows the bypass points in a simplified radix-2 barrier synchronization circuit.
Figure 9:
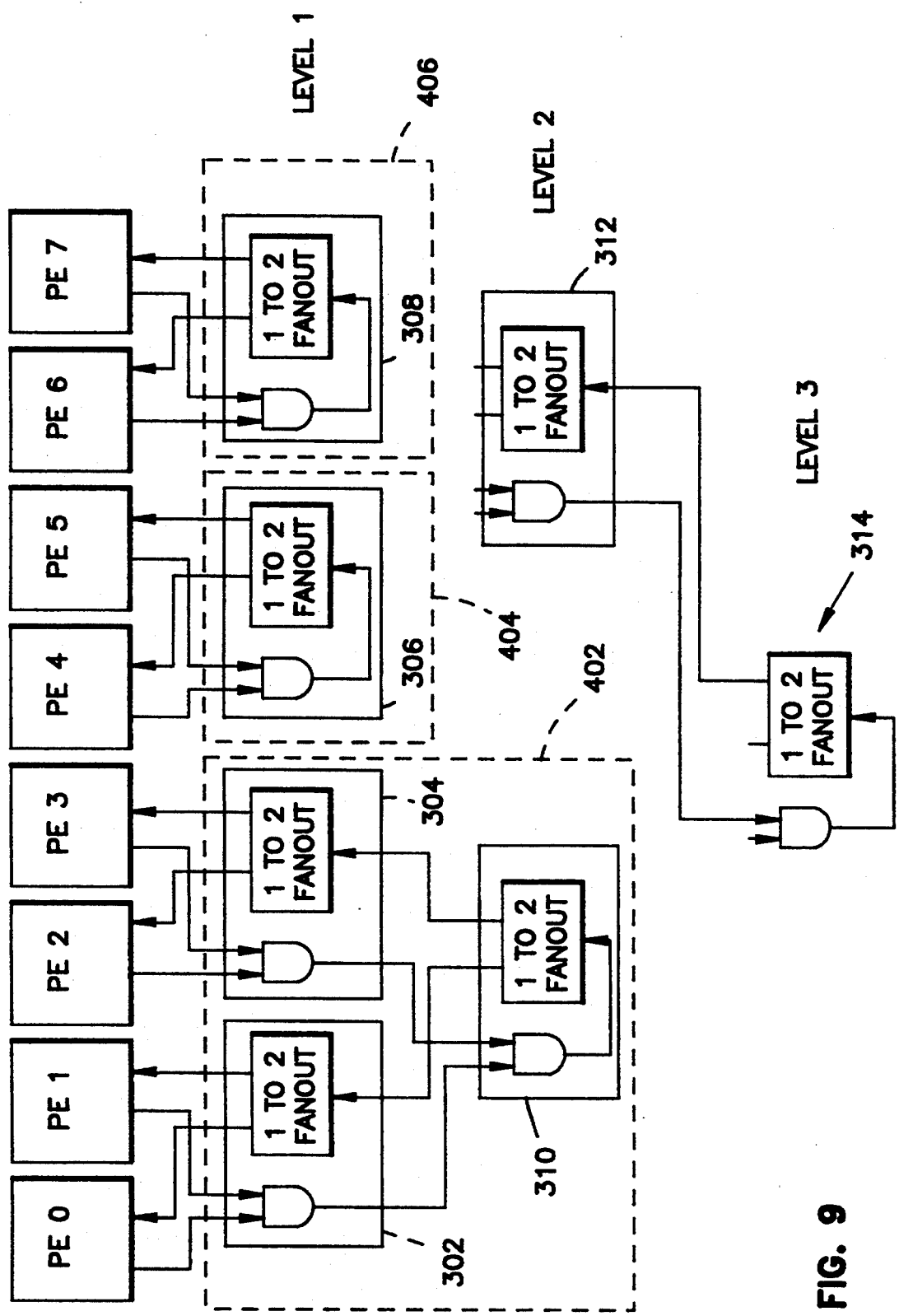
FIG. 9 shows the barrier synchronization circuit of FIG. 8, with some of the bypass points redirected to the fanout block.

FIG. 8 shows bypass points 302, 304, 306, 308, 310, 312 and 314 in a simplified radix-2 barrier synchronization circuit. In the preferred embodiment, the output of the AND gate in each of the bypass points can be redirected so that the output of the AND gate connects to the fanout block in that bypass point. For example, FIG. 9 shows the same barrier synchronization circuit as shown in FIG. 8. However, the output of the AND gate in bypass points 306, 308 and 310 is redirected to the fanout block in those bypass point. This results in a partitioning of the physical barrier synchronization circuit into three smaller barrier synchronization circuits, designated by phantom lines 402, 404 and 406.

The first circuit designated by phantom line 402 contains a two-level AND-tree and two-level fanout tree. This circuit is created by redirecting the output of the AND gate in bypass point 316 to the fanout block in bypass point 0. This smaller circuit operates identically to the barrier synchronization circuit in FIG. 8. However, this circuit receives an input from and sends an output to PEs 0 through 3 only.

The second and third circuits designated by phantom lines 404 and 406, respectively, each contain a one-level AND-tree and fanout tree. These circuits are created by redirecting the output of the AND gates in bypass points 306 and 308 to the fanout blocks in bypass points 306 and 308.

Figure 10A:
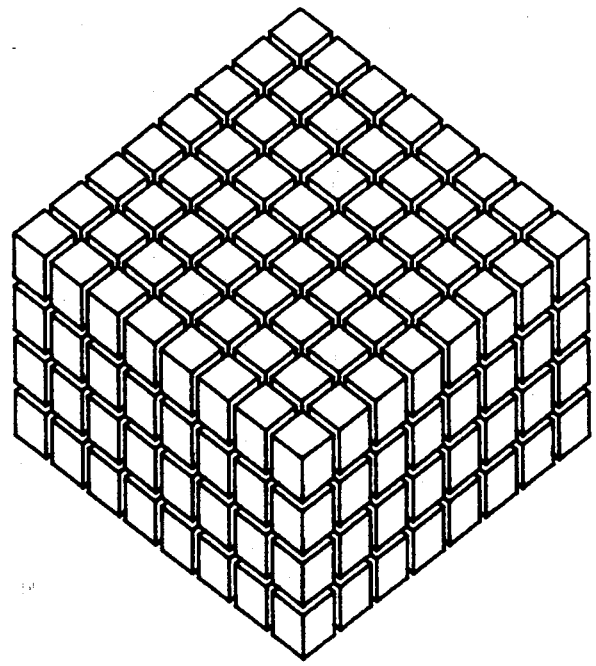
FIGS. 10A-E show how a 512 PE system can be partitioned at each level of a barrier synchronization circuit.

The bypass mechanism just described can be used to create several types of barrier partitions. FIG. 10 shows the resulting partitions when the PEs, in a 1024-PE MPP system using a radix-4 AND-tree and fanout tree are partitioned at each level of a physical barrier synchronization circuit. Each bypass point in level 1 of a physical barrier synchronization circuit connects to four PEs for a total of 256 level 1 bypass points. If all 256 of these bypass points have the output of the AND gate redirected to the fanout block, the PEs in the system are divided into 256 4-PE partitions, as shown in FIG. 10A.

Figure 10B:
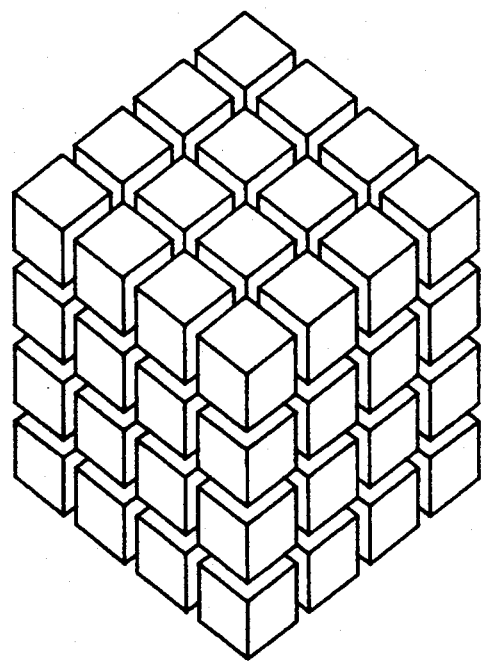

If all 32 of the level 2 bypass points have the output of the AND gate redirected to the fanout block, the PEs in the system are divided into 64 16-PE partitions, as shown in FIG. 10B.

Figure 10C:
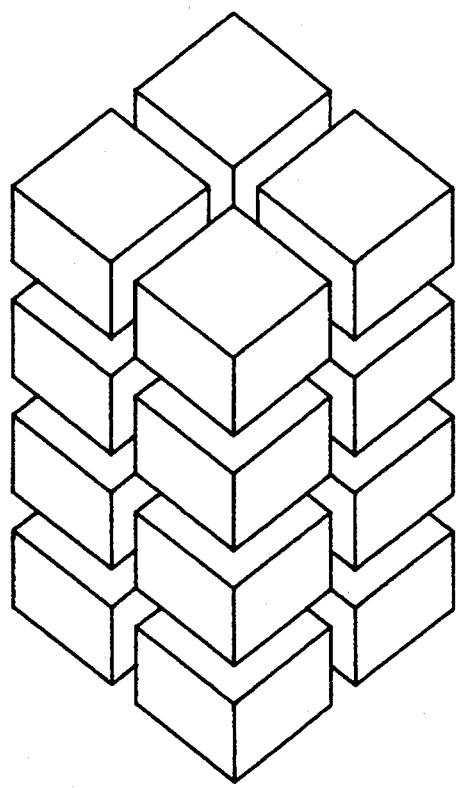

If all 8 of the level 3 bypass points have the output of the AND gate redirected to the fanout block, the PEs in the system are divided into eight 128-PE partitions, as shown in FIG. 10C.

Figure 10E:
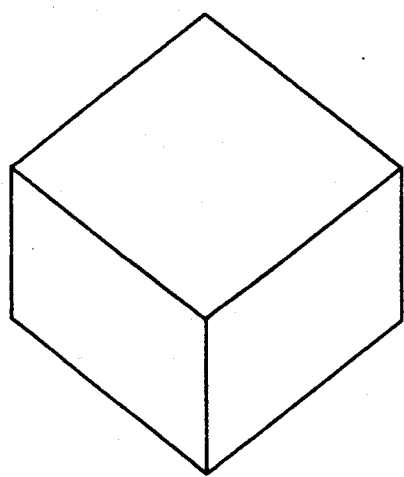
Figure 10D:
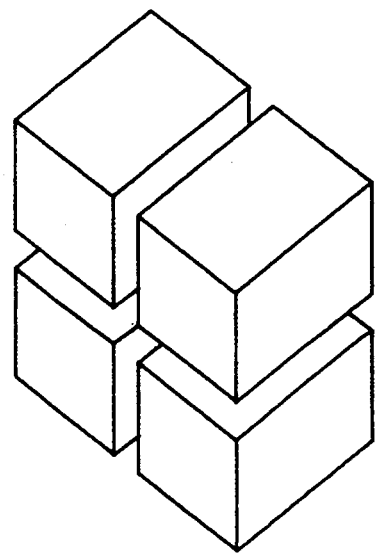

If all 4 of the level 4 bypass points have the output of the AND gate redirected to the fanout block, the PEs in the system are divided into four 256-PE partitions, as shown in FIG. 10D.

If both of the level 5 bypass points have the output of the AND gate redirected to the fanout block, the PEs in the system are partitioned as one 1024 PE partition, as shown in FIG. 10E.

The partitions shown in FIG. 10 are only a subset of those that can be achieved using the bypass mechanism of the present barrier invention. FIG. 10 shown only those achieved by redirecting all of the bypass points at each level. However, any number of bypass points in any number of different levels can be redirected to achieve a wide variety of bypass partitions. Thus, many different partitions of different sizes can be created simultaneously, in the manner such as that shown in FIG. 9. The result is a very flexible and scalable barrier resource. It shall therefore be appreciated by those of skill in the art that different partitions within the barrier mechanism can have bypass points enabled at different levels, and that sub-partitions of the partitions can have their barrier circuits bypassed at different levels, etc., conferring a great degree of flexibility of final partition subdivision upon the barrier tree.

When a bypass point of a barrier synchronization circuit has the output of the AND gate redirected to the fanout block, the PEs in the barrier partition can still use all 16 bits in BSR0 and BSR1; however, because there are only four physical barrier synchronization circuits, creating a barrier partition affects the four of the 16 bits in BSR0 and BSR1 which are input to the barrier synchronization circuit. For example, if a level 4 bypass point in physical barrier synchronization circuit 2 has the output of the AND gate redirected to the fanout block, the barrier partition contains 256-PEs. Because of this barrier partition, bits $2^2$, $2^6$, $2^{10}$, and $2^{14}$ of BSR0 and BSR1 (the bits that are time multiplexed into the same physical barrier synchronization circuit as described above with respect to Table 7) in each of the 256-PEs that are part of the barrier partition only affect the 256-PEs in the barrier partition. In the 256-PEs, these bits cannot be used for system-level barrier or eureka synchronization, but can be used only for partition-level barrier or eureka synchronization for the PEs in the partition. This is because the other 768 PEs in the 1024-PE system are not part of the partition created and thus barrier communication amongst all PEs is not available in that instance.

Note that, unlike barrier partitions created using the BSMI register described above, each of the PEs in a partition created when the barrier network is bypassed still is able to use all 16 inputs of the BSR0 and BSR1 registers, just as in the case of an undivided network. Each PE has all 16 barrier bits available to it because none are being masked to create the partition. This gives the characteristic of scalability to the barrier resource: each sub-network created through bypassing the barrier circuits is an independently functioning copy of a barrier bit. Thus, the same bit in the barrier register can serve many separate partitions.

A further advantage of partitions created when the network is bypassed in a manner such as that shown in FIGS. 9 and 10 is that the latency of a barrier is reduced as levels of the fan-in/fan-out tree are avoided. The smaller the partition, the lower the latency.

Flexible Barrier Resource

As is well known by those skill in the art, various processing tasks require partitions of particular sizes and shapes to achieve the most efficient performance. By redirecting the output of AND gates in different level bypass points, a physical barrier synchronization circuit may be divided into any combination of the previously described barrier partitions. However, the number and shape of the PEs in the partitions achieved with physical barrier partitioning alone may not exactly match the size and shape of partition desired.

The barrier network subdivisions are arranged so that they fall on power-of two boundaries coincident with the logical partitions created when the preferred 3-D torus interconnect network is subdivided. The 3-D torus interconnect network can be divided by two in any dimension, raising the probability of mismatches between the desired partitioning of the interconnect network and the partitioning of the barrier network achievable by means of the network bypass mechanism. In these cases, the BSMI register is used in concert with the physical barrier partitioning mechanism to accomplish the partitioning along the boundaries desired. The operating system can use the BSMI register to disable some of the bits in BSR0 and BSR1 for some of the PEs and enable these bits for the other PEs in the barrier partition to arrive at almost any desired group of PE partitions.

Figure 11:
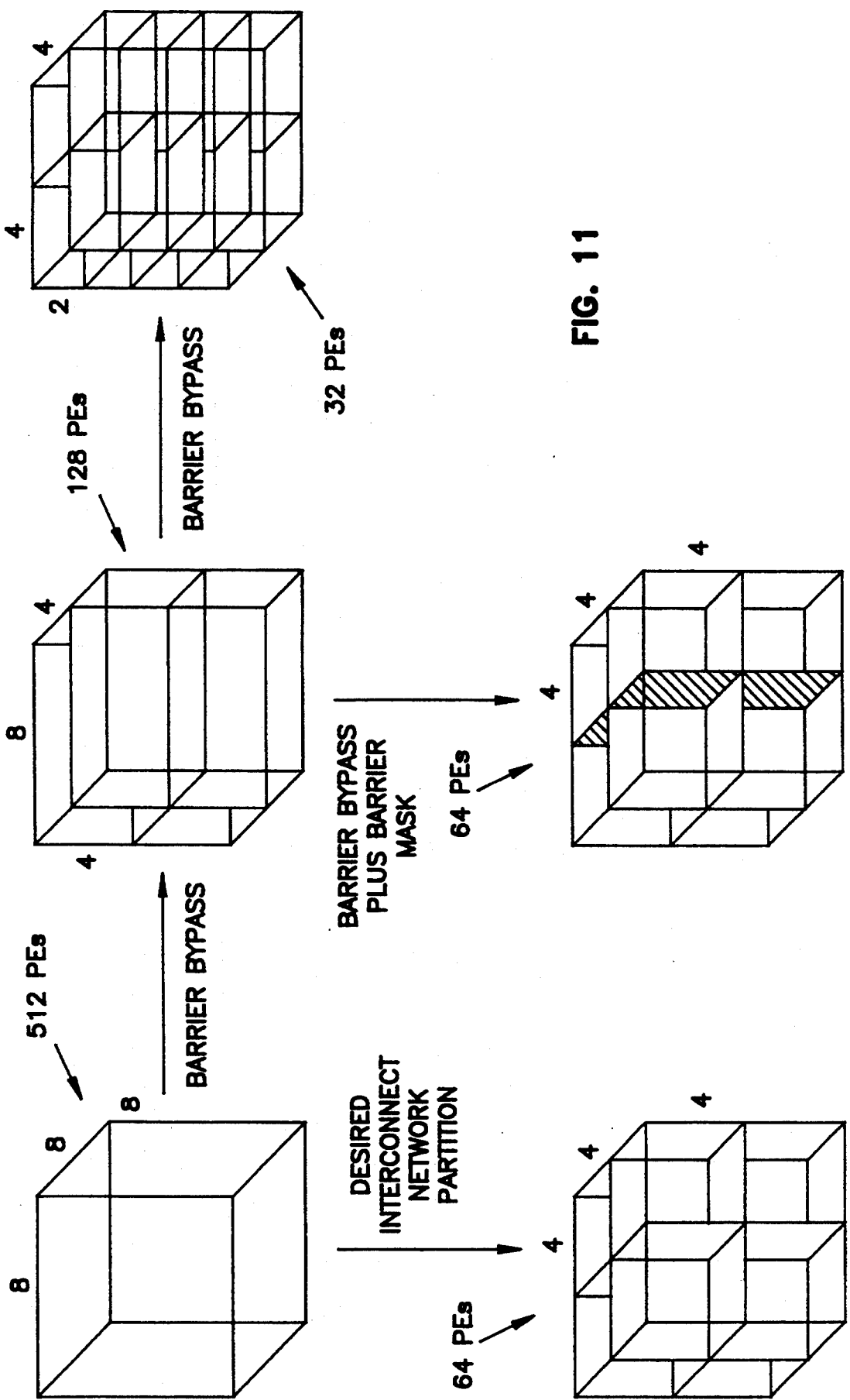
FIG. 11 shows how the barrier synchronization mask and interrupt (BSMI) register is used in concert with the bypass points in the barrier synchronization circuits to achieve the desired shape and size of a particular partition.

For example, it may be desirable to logically divide the 512-PE system and the associated $8 \times 8 \times 8$ 3-D torus network shown in the upper left of FIG. 11 into eight equal-sized 64-PE partitions with dimensions $4 \times 4 \times 4$ shown in the lower left of FIG. 11. Because of the radix-4 implementation of the barrier synchronization, the barrier synchronization circuits can only be divided by 4 using the bypass mechanism and the division is fixed in the dimensions that are affected. For example, the level 5 barrier synchronization circuit subdivision using the physical barrier partitioning will split the PEs into four 128-PE partitions each dimensioned $4 \times 4 \times 8$ as shown at the top center of FIG. 11. This is an insufficient level of subdivision to match the desired interconnect network partitioning already described. However, if the next level of physical barrier network partitioning is activated, it will split each partition by 4 again, into sixteen 32-PE partitions each dimensioned $4 \times 2 \times 4$ as shown at the far right of FIG. 11. This results in too much partitioning to match the desired group of eight 64-PE partitions.

To achieve the desired degree of partitioning, the barrier synchronization circuits are first physically partitioned using the level 5 bypass mechanism to achieve four $4 \times 4 \times 8$ partitions. The final division of the by-8 dimension is accomplished using the appropriate bits of the BSMI register. To achieve this result, the appropriate bit of the BSMI register of half of the PEs are set to 0, while the remaining half have their corresponding BSMI bit set to 1. This results in dividing the partitions in half to arrive at the desired partitioning of that shown in the bottom center of FIG. 11, which is a match for the desired partitioning shown in the lower left of FIG. 11.

Bypass Circuit Implementation

Figure 12:
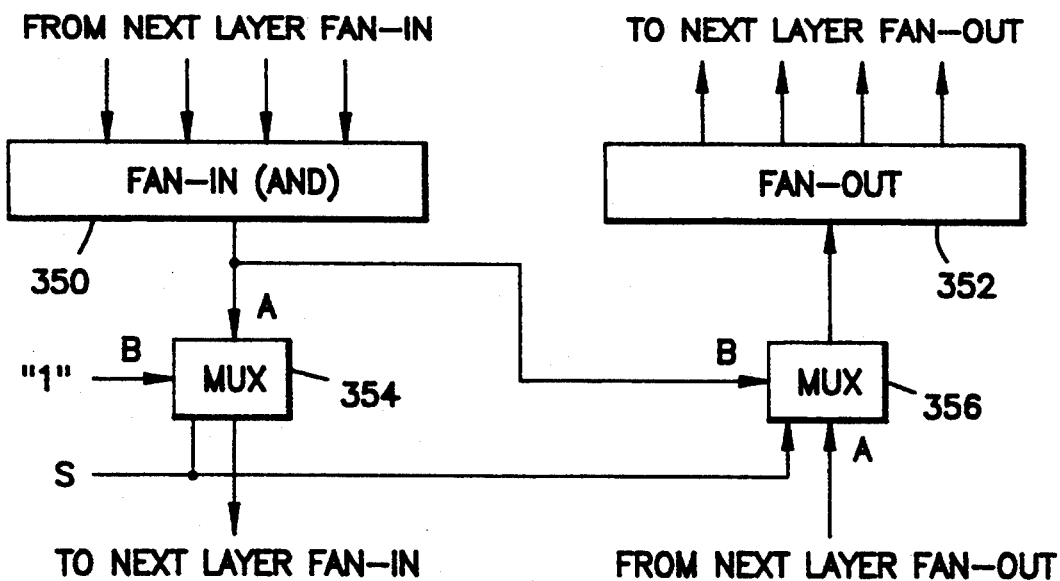
FIG. 12 shows the format of the barrier timing register BAR_TMG register.

FIG. 12 shows a block diagram of a hardware implementation for a radix-4 bypass circuit. The four inputs from the previous level of bypass circuits, or from the BSR0 or BSR1 registers if the bypass circuit is a level 1 bypass circuit, are input to four-input AND gate 350. The AND function is performed and the result output to the A input to mux 354 and to the B input to mux 356, which together form a "bypass switch".

The "B" input to mux 354 is hardwired to a logical "1". The A input to mux 356 is received from the next level of fan-out in the fan-out tree.

For normal barrier synchronization circuit operation, select signal "S" is set such that the A input to both mux 354 and mux 356 are selected. If the output of AND 350 is to be redirected to fan-out circuit 352, select signal "S" is set such that the B inputs to mux 357 and mux 356 are selected. Thus, the result of the AND 350 is selected by mux 356. In this manner, the physical barrier partitioning achieved by "short-circuiting" the bypass circuits is accomplished.

However, if the output of the AND is to be redirected to the fanout block, the select line of mux 356 will select such that the AND output transmitted to the fanout circuit 352 by mux 356.

Timing

Because a physical barrier synchronization circuit may be divided into partitions, and because the 16 barrier bits are actually implemented by time-multiplexing on 4 physical barrier circuits, the total time for a bit to propagate through the circuit is not constant. This timing inconsistency may cause a bit to be in the wrong position when BSR0 or BSR1 is read. For example, if the timing is not set up correctly for physical barrier synchronization circuit 0, a bit that was originally written to the $2^0$ bit location in BSR0 may appear in the $2^4$ bit location of BSR0 when BSR0 is read (refer again to Table 7).

Figure 13:
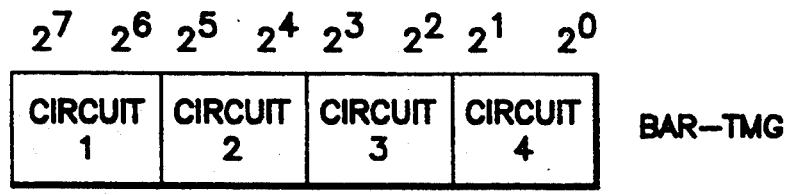
FIG. 13 shows a block diagram of a bypass point.

Because the barrier synchronization circuits are time multiplexed, and each bit in a barrier register is updated only every four clock periods, it is necessary for the depth of the pipelined fan-in/fan-out tree to be a multiple of four clock periods deep regardless of how it is configured or bypassed. When a physical barrier synchronization circuit is divided into barrier partitions, the time needed for a bit to propagate through each physical barrier synchronization circuit is not consistent. Since bypassing a level can remove a non-multiple-of-four number of clock periods of circuitry, it is necessary to have some programmable delays to adjust the apparent depth of the barrier network pipeline to a multiple of four after a bypass is implemented. These programmable delays, capable of adding from 0 to 3 clocks of delay, are located at each PE and skew the signal arriving from the barrier network for each of the 4 physical circuits. The delays are programmed by writing an 8-bit memory-mapped register called the Barrier Timing register (BAR_TMG). FIG. 13 shows the bit format of the BAR_TMG register. This register is organized as four groups of two bits, each of which represents a delay from 0 to 3 clocks to be added to one of the four physical barrier synchronization circuit outputs to correct the pipeline depth.

The BAR_TMG register is an 8-bit, write-only, system privileged register. The BAR_TMG register controls the timing of each physical barrier synchronization circuit. Table 9 shows the bit format of the BAR_TMG register.

TABLE 9

| Bits | BAR_TMG Bit Format Name |
|---|---|
| $2^1$-$2^0$ barrier | These bits control the timing for physical synchronization circuit 0. |
| $2^3$-$2^2$ barrier | These bits control the timing for physical synchronization circuit 1. |
| $2^5$-$2^4$ barrier | These bits control the timing for physical synchronization circuit 2. |
| $2^7$-$2^6$ barrier | These bits control the timing for physical synchronization circuit 3. |
| $2^{63}$-$2^8$ | These bits are not used. |

As an example, the following procedure sets the BAR_TMG timing value for physical barrier synchronization circuit 0 in the PEs of a barrier partition. Before performing the procedure, Barrier hardware interrupt to the processors should be disabled.

1. Write a value of $1111_{16}$ to the BSMI register in all of the PEs to enable barrier bits $2^{12}$, $2^8$, $2^4$, and $2^0$.
2. Write a value of $1111_{16}$ to the BSFR in all of the PEs to set barrier bits $2^{12}$, $2^8$, $2^4$, and $2^0$ to eureka mode.
3. Write a value of $1111_{16}$ to BSR0 and BSR1 in all of the PEs to start the eureka processes.
4. In one of the PEs write a value of $1110_{16}$ to BSR0 to indicate that bit $2^0$ has completed a eureka.
5. In each of the PEs, read the value of BSR1 which contains the value of all 16 barrier bits and apply a software mask so that the only bits read are $2^{12}$, $2^8$, $2^4$, and $2^0$ and the remaining bits are set to 0. The value read from BSR1 may be $1110_{16}$, $1101_{16}$, $1011_{16}$, or $0111_{16}$. If the value is not $1110_{16}$, increment bits $2^1$ through $2^0$ of the BAR_TMG register by 1 and read the value of BSR1 again.
6. If the value read from BSR1 is now $1110_{16}$, the timing is set up correctly. If the value is not $1110_{16}$, increment bits $2^1$ through $2^0$ of the BAR_TMG register by 1 and read the value of BSR1 again. This process must be repeated until the value read from BSR1 is $1110_{16}$, but should not need to be performed more than three times. This is because if it is correct, the value need not be incremented at all, and if it is not correct, incrementing by three will cause the BSR1 to run through all four possible values.

This procedure may be used to set the timing for any of the physical barrier synchronization circuits in a barrier partition. Table 10 lists the barrier bits affected and the write pattern for each physical barrier synchronization circuit.

TABLE 10

| | Timing Procedure Values | |
|---|---|---|
| 0 | $2^{12}$, $2^8$, $2^4$, and $2^0$ | $1110_{16}$ |
| 1 | $2^{13}$, $2^9$, $2^5$, and $2^1$ | $2220_{16}$ |
| 2 | $2^{14}$, $2^{10}$, $2^6$, and $2^2$ | $4440_{16}$ |
| 3 | $2^{15}$, $2^{11}$, $2^7$, and $2^3$ | $8880_{16}$ |

Barrier Synchronization Register Implementation

Figure 14:
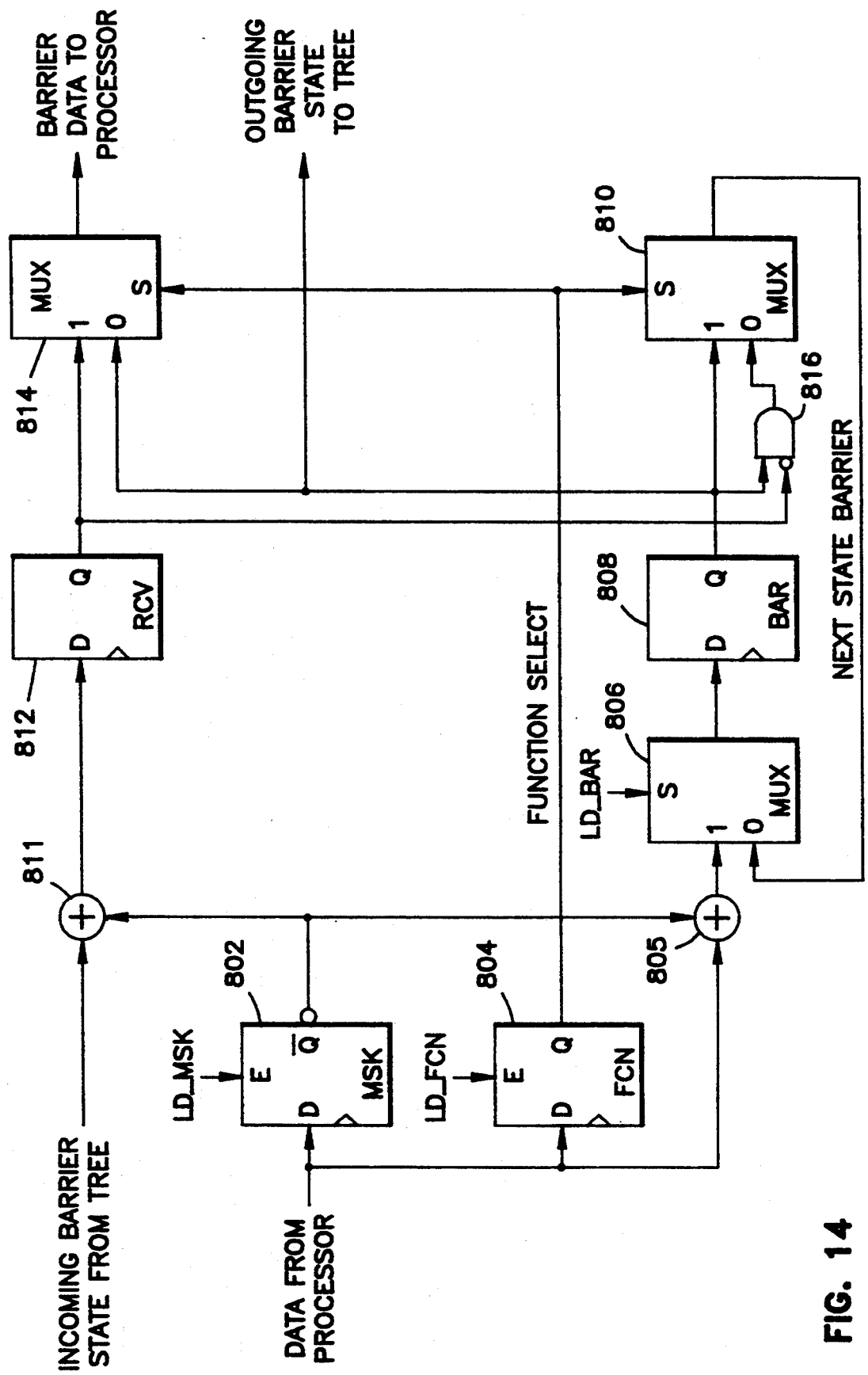
FIG. 14 shows the hardware state sequencing implementation for a single barrier bit.

A single bit of the barrier registers BSR0 or BSR1, BMSI and BSFR associated with a PE is illustrated in FIG. 14. As stated above, all 16 bits in the preferred barrier register function identically. For simplicity of illustration, only the circuitry associated with one bit is shown. Also, note that the barrier network is not shown, nor is the circuitry used to interface the barrier registers to the microprocessor.

In FIG. 14, multiplexors are market "MUX" and have a select input "S" and a pair of data inputs "1" and "0" that are gated to the output depending on the state of the "S" input. Latches have a data input "D" and a clocked output "Q" and may have an enable input "E" that controls when new data is to be captured. If a latch does not have an "E" input, then new data is captured every clock.

The three principle barrier registers are identifiable as the mask latch 802 (for BSMI), the function latch 804, and the barrier register itself, latch 808 (for BSR0 or BSR1). Data from the microprocessor can be entered into any of these latches via the processor writing to special memory-mapped addresses. Control hardware decodes the address to generate one of the control signals LD_MSK, LD_FCN, or LD_BAR. LD_MSK enables data to be entered the mask latch 802, LD_FCN enables data to be entered the function latch 804, and LD_BAR controls the input multiplexor 806 that gates data into barrier register latch 808 every clock period. Data in the mask 802 and function 804 latches is held in the absence of the enable signals, while the barrier latch hold path is through multiplexors 810 and 806.

If mask latch 802 has been set to a 0 (disabling the barrier bit), data is inhibited from entering the barrier register latch 808 by forcing a constant 1 via OR gate 805. This forces a constant 1 into the barrier network as well, allowing other selected bits at other PEs to function normally. A 0 in the mask latch 802 also forces a 1 into the receive latch 812 through OR gate 811. This disables the local processor from "eavesdropping" on the barrier activities of other PEs while deselected and prevents spurious barrier interrupts from deselected barrier bits.

Function latch 804 controls multiplexors 814 and 810. If the function latch 804 is set to 0 (barrier mode), mux 814 delivers the current state of the barrier register while mux 810 causes the barrier register latch to remain set if it is currently set as long as the incoming barrier state is still a zero (i.e., the barrier has not been satisfied). When the incoming barrier state switches to a 1, indicating that all PEs have set their barrier bits, then the barrier register hold path is broken by AND gate 816 and barrier register 808 reverts to a 0 until it is set again by the processor. Thus, the barrier mode is a synchronous and immediately reusable mode.

If function latch 804 is set to a 1 (eureka mode), mux 814 continuously gates the incoming state of the barrier tree to the processor through 811 and 812 and, while mux 810 causes the barrier register latch to remain at whatever state, 0 or 1, that the processor sets it to. Thus, the eureka mode is asynchronous: any changes to the barrier registers flow through the barrier tree and are directly sampled by the processors, allowing the AND-tree of the barrier synchronization circuit to be used as an OR-tree for eureka barriers.

Although specific embodiments have been illustrated and described herein for purposes description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those of skill in the electrical and computer arts will readily appreciate that the present invention may be implemented in a very wide variety of embodiments. This application is intended to cover any adaptations or variations of the preferred embodiment discussed herein. Therefore, it is manifestly intended that this invention be limited only by the claims and the equivalents thereof.

What is claimed is:

1. A system for processor barrier synchronization of a plurality of processing elements (PEs) in a distributed processing computer, comprising:
   a barrier detection program means operative in each PE to determine when each individual PE has reached a processor barrier;
   a plurality of boolean DONE outputs from each PE, each output controlled by the barrier detection program means, indicating when a processor barrier was reached by that PE;
   a plurality of processor barrier synchronization circuits for detecting which PEs have reached a processor barrier, comprising:
      a plurality of boolean logical AND gates connected to corresponding DONE outputs of the plurality of PEs to indicate when all of the PEs reach a processor barrier;
      an ALLDONE signal output from the plurality of AND gates for providing an output indicating that all of the PEs have reached a particular processor barrier; and
      a plurality of logical fanout devices, with inputs connected to the ALLDONE signal line and outputs connected to the multiplicity of PEs to indicate to every PE in the system that the particular processor barrier was reached; and
   a plurality of barrier synchronization registers (BSRs) for storing the status of each barrier synchronization process.

2. A computer system comprising:
   a plurality of processing elements (PEs) including a first processing element (PE), wherein said first PE comprises:
      a barrier synchronization register one (BSR1), said BSR1 including a first BSR bit and a second BSR bit, wherein said first BSR bit and said second BSR bit are set when said first PE reaches a first barrier point and a second barrier point, respectively;
      a first BSR output; and
      a coupler which couples a value representative of said first BSR bit to said first BSR output; and
   a barrier synchronization mechanism (BSM) having a first physical barrier synchronization circuit (PBSC), wherein said PBSC comprises a plurality of bypass points including a first bypass point and a second bypass point, wherein each of said bypass points comprise:
      a fanin gate having a plurality of fanin inputs and a fanin output, wherein said fanin output generates an indication of whether said fanin inputs are all set;
      a fanout circuit having a fanout input and a fanout output; and
      a bypass switch for switchably coupling said fanin output to said fanout input;
   wherein one of the fanin inputs of said first bypass point is coupled to said first BSR output, wherein one of the fanin inputs of said second bypass point is coupled to the fanin output of said first bypass point, wherein the fanout input of said second bypass point is coupled to the fanin output of said second bypass point, wherein the fanout input of said first bypass point is coupled to the fanout output of said second bypass point, and wherein the fanout output of said first bypass point is coupled to said first PE.

3. The computer system according to claim 2, wherein
   said coupler comprises a time multiplexor (TM), wherein said TM time-multiplexes said first BSR bit and said second BSR bit on said first BSR output.

4. The computer system according to claim 2, wherein said BSM further comprises a second PBSC wherein said second PBSC comprises:
   a third and a fourth bypass point, wherein each of said bypass points comprise:
      a fanin gate having a plurality of fanin inputs and a fanin output which generates an indication of whether said fanin inputs are all set;
      a fanout circuit having a fanout input and a fanout output; and
      a bypass switch for switchably coupling said fanin output to said fanout input;
   wherein said first PE further comprises a second BSR output;
   wherein said coupler further couples a value representative of said second BSR bit to said second BSR output; and
   wherein one of the fanin inputs of said third bypass point is coupled to said second BSR output, wherein one of the fanin inputs of said fourth bypass point is coupled to the fanin output of said third bypass point, wherein the fanout input of said fourth bypass point is coupled to the fanin output of said fourth bypass point, wherein the fanout input of said third bypass point is coupled to the fanout output of said fourth bypass point, and wherein the fanout output of said third bypass point is coupled to said first PE.

5. The computer system according to claim 2, wherein said BSM further comprises a second PBSC, wherein said second PBSC comprises:
   a third and a fourth bypass point, wherein each of said bypass points comprise:
      a fanin gate having a plurality of fanin inputs and a fanin output which generates an indication of whether said fanin inputs are all set;
      a fanout circuit having a fanout input and a fanout output; and
      a bypass switch for switchably coupling said fanin output to said fanout input;
   wherein said BSR1 further includes a third and a fourth BSR bit which are set when said first PE reaches a third and a fourth barrier point, respectively;
   wherein said first PE further comprises a second BSR output;
   wherein said coupler comprises a time multiplexor, wherein said TM time-multiplexes said first BSR bit and said second BSR bit on said first BSR output, and wherein said TM time-multiplexes said third BSR bit and said fourth BSR bit on said second BSR output; and wherein one of the fanin inputs of said third bypass point is coupled to said second BSR output, wherein one of the fanin inputs of said fourth bypass point is coupled to the fanin output of said third bypass point, wherein the fanout input of said fourth bypass point is coupled to the fanin output of said fourth bypass point, wherein the fanout input of said third bypass point is coupled to the fanout output of said fourth bypass point, wherein the fanout output of said third bypass point is coupled to said first PE.

6. A computer system according to claim 2, wherein the fanout output of said first bypass point generates an interrupt to said first PE.

7. A computer system according to claim 2, wherein the fanout output of said first bypass point controls a value which is polled by said first PE.

8. A method for barrier synchronization on a computer system, said computer system having a plurality of processing elements (PEs) including a first PE, and a physical barrier synchronization circuit including a plurality of bypass points each having a fanin gate and a fanout circuit, wherein said bypass points are arranged in a tree having a plurality of levels, each of said plurality of PEs including a barrier synchronization register one (BSR1) and a first BSR output, each said BSR1 having a first BSR bit set when its associated PE reaches a first barrier point, the method comprising the steps of:

outputting a value representative of the first BSR bit on the first BSR output of each of said PEs;

fanning-in a value from the first BSR outputs from a first plurality of said PEs to generate a first barrier-completion signal;

selectively bypassing said first barrier completion signal at one of the plurality of levels from the fanin gate to the fanout circuit in order to partition the tree; and fanning-out said first barrier completion signal to each of said first plurality of PEs.

9. A method according to claim 8, wherein each said BSR1 further includes a second BSR bit set when its associated PE reaches a second barrier point wherein the step of outputting comprises the step of time multiplexing said first BSR bit and said second BSR bit.

10. A method according to claim 8, wherein each said BSR1 further includes a second, third, and fourth BSR bit set when its associated PE reaches a second, third and fourth barrier point, respectively, and a second BSR output, wherein the step of outputting comprises the steps of:
time multiplexing said first BSR bit and said second BSR bit to said first BSR output; and
time multiplexing said third BSR bit and said fourth BSR bit to said second BSR output.

* * * * *

UNITED STATES PATENT AND TRADEMARK OFFICE
CERTIFICATE OF CORRECTION

PATENT NO. : 5,434,995

DATED : July 18, 1995

INVENTOR(S) : Steven M. Oberlin and Eric C. Fromm

It is certified that error appears in the above-indentified patent and that said Letters Patent is hereby corrected as shown below:

Column 6, line 49, please delete "BSR0 in PE0" and insert --
BSR0 in PE 0-- therefore.

Signed and Sealed this

Seventh Day of November, 1995

Attest:

BRUCE LEHMAN

Attesting Officer      Commissioner of Patents and Trademarks